United States Patent
Kimura

(10) Patent No.: US 7,839,328 B2
(45) Date of Patent: Nov. 23, 2010

(54) POSITIONING DEVICE, ELECTRONIC INSTRUMENT, AND STORAGE MEDIUM STORING PROGRAM

(75) Inventor: Akira Kimura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/493,991

(22) Filed: Jun. 29, 2009

(65) Prior Publication Data

US 2009/0262020 A1    Oct. 22, 2009

Related U.S. Application Data

(63) Continuation of application No. 11/839,614, filed on Aug. 16, 2007, now Pat. No. 7,570,207.

(30) Foreign Application Priority Data

Oct. 26, 2006    (JP)    .............................. 2006-290818

(51) Int. Cl.
*G01S 19/42* (2010.01)
*H04B 1/00* (2006.01)

(52) U.S. Cl. .................. 342/357.25; 375/149
(58) Field of Classification Search ............ 342/357.12, 342/357.25; 375/149
See application file for complete search history.

(56) References Cited

U.S. PATENT DOCUMENTS

| 5,615,236 | A | 3/1997 | Turney |
| 5,884,214 | A | 3/1999 | Krasner |
| 5,896,304 | A | 4/1999 | Tiemann et al. |
| 6,078,290 | A | 6/2000 | McBurney et al. |
| 6,118,808 | A | 9/2000 | Tiemann et al. |
| 7,358,895 | B2 | 4/2008 | Ziedan et al. |
| 2004/0190659 | A1 | 9/2004 | Raj et al. |
| 2004/0266376 | A1 | 12/2004 | Cowley et al. |
| 2005/0003785 | A1 | 1/2005 | Jackson et al. |
| 2005/0041724 | A1 | 2/2005 | Chansarkar |
| 2005/0046614 | A1* | 3/2005 | Akano ................... 342/357.02 |
| 2006/0159161 | A1* | 7/2006 | Murakami ................... 375/149 |
| 2006/0176167 | A1 | 8/2006 | Dohrmann |
| 2006/0273961 | A1 | 12/2006 | Duzdar et al. |
| 2006/0293852 | A1 | 12/2006 | Tsurumi |
| 2008/0316086 | A1 | 12/2008 | Hoctor et al. |

FOREIGN PATENT DOCUMENTS

| JP | S61-122583 A | 8/1986 |
| JP | H11-258326 A | 9/1999 |
| JP | 2002-512741 A | 4/2002 |
| JP | 2005-321301 A | 11/2005 |
| JP | 2006-502412 A | 1/2006 |
| JP | 2006-162501 A | 6/2006 |
| KR | 10-2006-0093978 A | 8/2006 |
| WO | WO-2004/034077 A2 | 4/2004 |

* cited by examiner

*Primary Examiner*—Thomas H Tarcza
*Assistant Examiner*—Harry Liu
(74) *Attorney, Agent, or Firm*—Global IP Counselors, LLP

(57) ABSTRACT

Signals output from two filters included in a filter section 70 and differing in passband are respectively stored in different memories included in a memory section 80, and a positioning process is performed based on the signal stored in the memory. Specifically, the signal strength of a received signal is calculated by a coherent accumulation process and an incoherent accumulation process, and a signal system used for positioning is alternatively switched to a high-sensitivity system S1 or a high-accuracy system S2 as a result of determining whether or not the signal strength is equal to or greater than a threshold value.

13 Claims, 11 Drawing Sheets

POSITIONING DEVICE, ELECTRONIC INSTRUMENT, AND STORAGE MEDIUM STORING PROGRAM

This is a continuation application of U.S. patent application Ser. No. 11/839,614 filed on Aug. 16, 2007, now pending, which claims priority to Japanese Patent Application No. 2006-290818 filed on Oct. 26, 2006. The entire disclosure of U.S. patent application Ser. No. 11/839,614 and Japanese Patent Application No. 2006-290818 is hereby incorporated by reference.

BACKGROUND OF THE INVENTION

The present invention relates to a positioning device, an electronic instrument, and a storage medium storing a program.

A global positioning system (GPS) is widely known as a positioning system using satellites, and is utilized for a car navigation system and the like. The GPS allows the present position to be located by acquiring/extracting a GPS satellite signal from signals received from a plurality of GPS satellites, and performing positioning calculations based on a navigation message acquired from the GPS satellite signal and the like.

The GPS satellite signal is a spread-spectrum-modulated signal called a coarse and acquisition (C/A) code. The polarity of the C/A code is reversed every 20 milliseconds (ms) according to the navigation message (e.g. JP-A-11-258326).

In order to extract and acquire the GPS satellite signal from the received RF signal, the reception sensitivity (hereinafter simply called "sensitivity") is increased by filtering the received signal (or an intermediate-frequency signal converted from the received signal) to remove unnecessary frequency components. In particular, since the GPS satellite signal has a specific frequency, the sensitivity may be increased by narrowing the passband of the filter in order to extract only components around the specific frequency (or the frequency of the GPS satellite signal when converted into an intermediate-frequency signal).

However, even if the GPS satellite signal has a specific frequency when transmitted from the GPS satellite, the GPS satellite signal does not have the specific GPS frequency when the GPS receiver receives the GPS satellite signal due to the Doppler shift caused by the movement of the GPS satellite around the earth, effects occurring when the signal passes through the ionosphere and the atmosphere, effects caused by a multipath, and the like. Therefore, when narrowing the passband of the filter to a large extent, the spread-spectrum-modulated GPS satellite signal may be partially lost, whereby the positioning accuracy (hereinafter simply called "accuracy") may decrease.

On the other hand, when increasing the passband of the filter, the number of noise components other than the GPS satellite signal increases, whereby the reception sensitivity decreases due to deterioration in S/N ratio. Specifically, since the accuracy and the sensitivity have a trade-off relationship, the filter must be designed so that both accuracy and sensitivity are achieved to a certain extent.

SUMMARY

According to one aspect of the invention, there is provided a positioning device comprising:

a plurality of filters which differ in passband, each of the filters extracting a signal in a specific frequency band from a signal received by an RF reception circuit section which receives a GPS satellite signal;

storage sections which correspond to the respective filters, each of the storage sections storing a signal output from the corresponding filter; and a positioning section which alternatively selects one of the storage sections and performs a specific positioning process based on the signal stored in the selected storage section.

DETAILED DESCRIPTION OF THE EMBODIMENT

Figure 1:
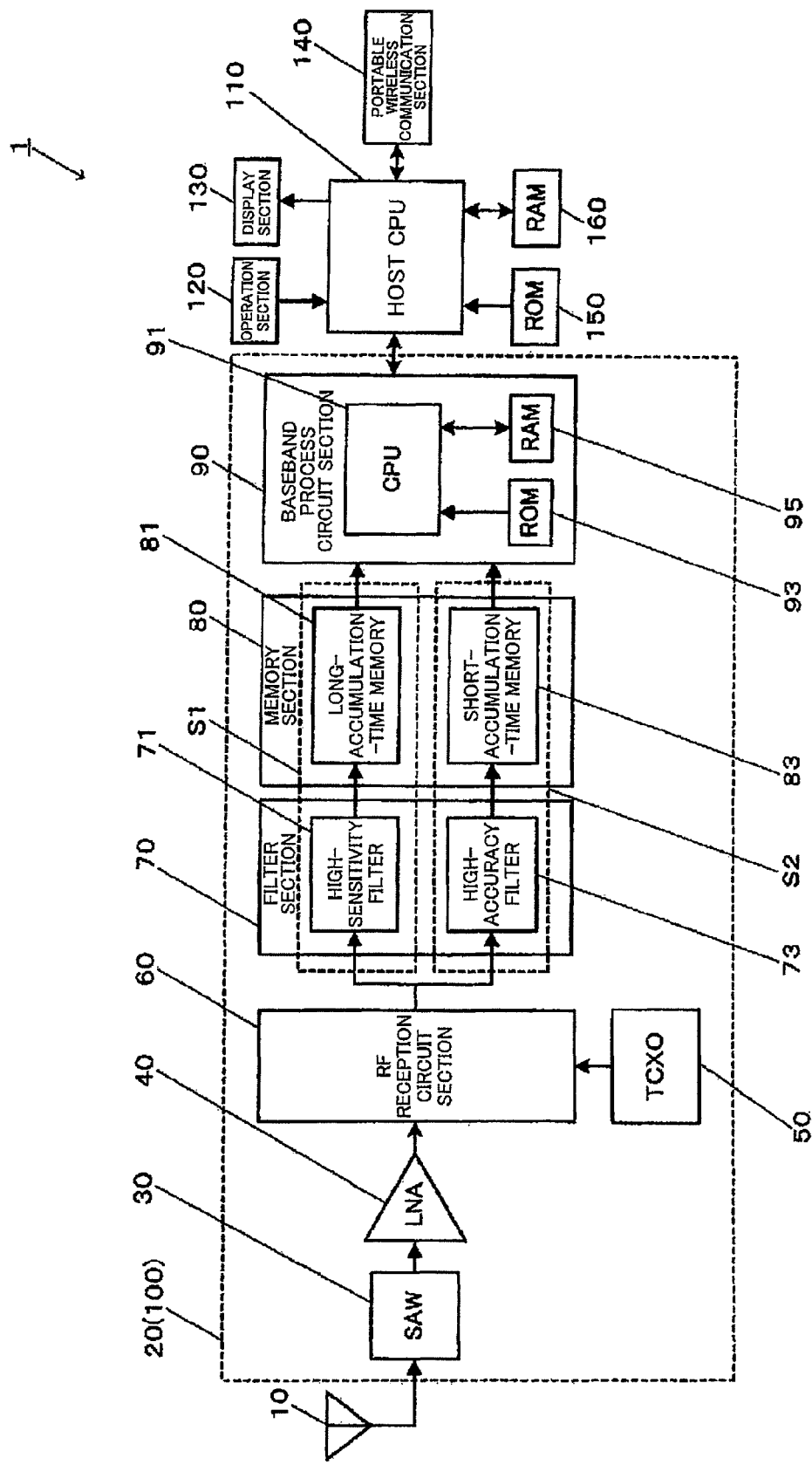
FIG. 1 is a block diagram showing the configuration of a portable telephone according to a first embodiment.

According to one embodiment of the invention, there is provided a positioning device comprising:

a plurality of filters which differ in passband, each of the filters extracting a signal in a specific frequency band from a signal received by an RF reception circuit section which receives a GPS satellite signal;

storage sections which correspond to the respective filters, each of the storage sections storing a signal output from the corresponding filter; and a positioning section which alternatively selects one of the storage sections and performs a specific positioning process based on the signal stored in the selected storage section.

According to another embodiment of the invention, there is provided a computer-readable storage medium storing a program for a device which includes a plurality of filters which differ in passband, each of the filters extracting a signal in a specific frequency band from a signal received by an RF reception circuit section which receives a GPS satellite signal, storage sections which correspond to the respective filters, each of the storage sections storing a signal output from the corresponding filter, and a processor which can execute a program, the program causing the processor to function as:

a positioning section which alternatively selects one of the storage sections and performs a specific positioning process based on the signal stored in the selected storage section.

According to the above configuration, the storage section is alternatively selected from the storage sections which correspond to the respective filters differing in passband and each of which stores the signal output from the corresponding filter, and the specific positioning process is performed based on the signal stored in the selected storage section. For example, a filter with a narrow passband and a filter with a wide passband are provided, and a signal which has passed through each filter is stored in the corresponding storage section. Therefore, it is possible to pursue sensitivity when the signal reception state is relatively poor by selecting the storage section corresponding to the filter with a narrow passband, and to pursue accuracy when the signal reception state is relatively good by selecting the storage section corresponding to the filter with a wide passband.

In the positioning device according to this embodiment, the positioning section may acquire the satellite signal by performing a coherent accumulation process for the signal stored in the selected storage section while changing a coherent accumulation time depending on the selected storage section, and then may perform the specific positioning process.

In the storage medium according to this embodiment, the positioning section may acquire the satellite signal by performing a coherent accumulation process for the signal stored in the selected storage section while changing a coherent accumulation time depending on the selected storage section, and then may perform the specific positioning process.

According to the above configuration, the coherent accumulation time is changed depending on the selected storage section. The satellite signal is acquired by performing the coherent accumulation process for the signal stored in the selected storage section, and the specific positioning process is performed.

In the positioning device according to this embodiment, the filters may have a passband inclusion relationship; and the positioning section may perform the coherent accumulation process with a longer coherent accumulation time for the signal stored in the storage section corresponding to the filter with a narrower passband.

In the storage medium according to this embodiment,
the filters may have a passband inclusion relationship; and
the positioning section may perform the coherent accumulation process with a longer coherent accumulation time for the signal stored in the storage section corresponding to the filter with a narrower passband.

According to the above configuration, the filters have a passband inclusion relationship, and the coherent accumulation process with a longer coherent accumulation time is performed for the signal stored in the storage section corresponding to the filter with a narrower passband. The amplitude of noise with respect to the signal can be generally more attenuated as the coherent accumulation time increases, whereby the sensitivity increases. Therefore, the sensitivity can be increased due to the longer coherent accumulation time in addition to an increase in sensitivity due to the narrower band by locating the position using the signal stored in the storage section corresponding to the filter with a narrower passband.

In the positioning device according to this embodiment, the GPS satellite signal received by the RF reception circuit section may include signals respectively transmitted from a plurality of satellites; and the positioning section may select the storage section and may acquire and/or track the satellite signal from the satellite in units of acquisition and/or tracking target satellites.

In the storage medium according to this embodiment, the GPS satellite signal received by the RF reception circuit section may include signals respectively transmitted from a plurality of satellites; and the positioning section may select the storage section and may acquire and/or track the satellite signal from the satellite in units of acquisition and/or tracking target satellites.

According to the above configuration, the storage section is selected and the satellite signal from the satellite is acquired and/or tracked in units of acquisition and/or tracking target satellites. Therefore, it is possible to selectively pursue accuracy or sensitivity in units of satellites such as pursuing accuracy for one satellite and pursuing sensitivity for another satellite.

In the positioning device according to this embodiment, the positioning section may include a switch determination section which determines whether or not to switch the storage section selected, 1) when an acquisition target satellite used for the positioning process has been changed, or 2) each time the positioning process is periodically performed, and may select the storage section determined by the switch determination section after the switch determination section has determined to switch the storage section.

In the storage medium according to this embodiment, the positioning section may include a switch determination section which determines whether or not to switch the storage section selected, 1) when an acquisition target satellite used for the positioning process has been changed, or 2) each time the positioning process is periodically performed, and may select the storage section determined by the switch determination section after the switch determination section has determined to switch the storage section.

According to the above configuration, whether or not to switch the storage section selected is determined when the acquisition target satellite used for the positioning process has been changed or each time the positioning process is periodically performed.

In the positioning device according to this embodiment, the switch determination section may determine whether or not to switch the storage section subsequently selected based on a signal strength calculated by the coherent accumulation process with a coherent accumulation time corresponding to the selected storage section.

In the storage medium according to this embodiment, the switch determination section may determine whether or not to switch the storage section subsequently selected based on a signal strength calculated by the coherent accumulation process with a coherent accumulation time corresponding to the selected storage section.

According to the above configuration, whether or not to switch the storage section selected is determined based on the signal strength calculated by the coherent accumulation process with a coherent accumulation time corresponding to the selected storage section. Therefore, it is possible to select the storage section corresponding to the filter with a broader band when the signal strength is high based on the determination that the satellite signal is easily acquired, and to select the storage section corresponding to the filter with a narrower band when the signal strength is low based on the determination that it is difficult to acquire the satellite signal.

In the positioning device according to this embodiment, the switch determination section may determine to switch the storage section to the storage section corresponding to the filter with a broader band when the signal strength calculated by the coherent accumulation process with a coherent accumulation time corresponding to the selected storage section satisfies a specific high-strength condition, and may determine to switch the storage section to the storage section corresponding to the filter with a narrower band when the signal strength satisfies a specific low-strength condition.

In the storage medium according to this embodiment, the switch determination section may determine to switch the storage section to the storage section corresponding to the filter with a broader band when the signal strength calculated by the coherent accumulation process with a coherent accumulation time corresponding to the selected storage section satisfies a specific high-strength condition, and may determine to switch the storage section to the storage section corresponding to the filter with a narrower band when the signal strength satisfies a specific low-strength condition.

According to the above configuration, the storage section is switched to the storage section corresponding to the filter with a broader band when the signal strength calculated by the coherent accumulation process satisfies a specific high-strength condition, and the storage section is switched to the storage section corresponding to the filter with a narrower band when the signal strength satisfies a specific low-strength condition. Therefore, it is possible to give priority to accuracy by selecting the storage section corresponding to the filter with a broader band under conditions where the satellite signal is easily acquired, and to give priority to acquisition of the satellite signal by selecting the storage section corresponding to the filter with a narrower band under conditions where it is difficult to acquire the satellite signal.

An electronic instrument according to this embodiment may comprise the positioning device.

A portable telephone including a positioning device and having a navigation function is described below with reference to the drawings as one embodiment of an electronic instrument. Note that the embodiments to which the invention can be applied are not limited to the following embodiment.

1. First Embodiment 1-1. Configuration and Operation

FIG. 1 is a block diagram showing the functional configuration of a portable telephone 1 according to a first embodiment. The portable telephone 1 includes a GPS antenna 10, a GPS reception section 20, a host central processing unit (CPU) 110, an operation section 120, a display section 130, a portable wireless communication section 140, a read only memory (ROM) 150, and a random access memory (RAM) 160.

The GPS antenna 10 is an antenna which receives an RF signal including a GPS satellite signal transmitted from a GPS satellite, and outputs the received RF signal to the GPS reception section 20.

The GPS reception section 20 includes a surface acoustic wave (SAW) section 30, a low noise amplifier (LNA) 40, a temperature controlled crystal oscillator (TCXO) 50, a radio frequency (RF) reception circuit section 60, a filter section 70, a memory section 80, and a baseband process circuit section 90, and forms a positioning device 100 which is a characteristic configuration according to this embodiment.

The RF reception circuit section 60 and the baseband process circuit section 90 of the GPS reception section 20 may be manufactured as different large scale integrated (LSI) circuits, or may be manufactured in one chip. The entire GPS reception section 20 including the SAW 30, the LNA 40, the TCXO 50, the filter section 70, and the memory section 80 may be manufactured in one chip.

The SAW section 30 is a bandpass filter which allows only a specific frequency band component of the RF signal received through the GPS antenna 10 to pass through, and outputs the signal which has passed through to the LNA 40.

The LNA 40 is a low noise amplifier which amplifies the signal which has passed through the SAW section 30, and outputs the amplified signal to the RF reception circuit section 60.

The TCXO 50 is a temperature-compensated crystal oscillator which generates an oscillation signal having a specific oscillation frequency, and outputs the generated oscillation signal to the RF reception circuit section 60.

The RF reception circuit section 60 generates an RF signal multiplication oscillation signal by dividing or multiplying the frequency of the oscillation signal input from the TCXO 50. The RF reception circuit section 60 down-converts the RF signal which has passed through the GPS antenna 10, the SAW section 30, and the LNA 40 into an intermediate-frequency signal (hereinafter called "IF signal") by multiplying the generated oscillation signal by the signal amplified by the LNA 40. After subjecting the IF signal to amplification and the like, the RF reception circuit section 60 converts the IF signal into a digital signal using an A/D converter, and outputs the digital signal to the filter section 70.

The filter section 70 is a circuit section including a plurality of low-pass filters which allow a component of the IF signal output from the RF reception circuit section 60 and having a frequency equal to or less than a specific cut-off frequency to pass through. The filter section 70 includes a high-sensitivity filter 71 and a high-accuracy filter 73.

The high-sensitivity filter 71 has a cut-off frequency of 600 kHz, and attenuates a component of the IF signal having a frequency exceeding 600 kHz, for example. The high-accuracy filter 73 has a cut-off frequency of 2 MHz, and attenuates a component of the IF signal having a frequency exceeding 2 MHz, for example. Specifically, the high-accuracy filter 73 has a band broader than that of the high-sensitivity filter 71.

Therefore, a signal which has passed through the high-sensitivity filter 71 contains a small amount of noise compared with a signal which has passed through the high-accuracy filter 73. On the other hand, since the amount of signal removed from a signal which has passed through the high-accuracy filter 73 is small compared with a signal which has passed through the high-sensitivity filter 71, the signal which has passed through the high-accuracy filter 73 contains a large amount of information compared with the signal which has passed through the high-sensitivity filter 71.

The memory section 80 includes a plurality of storage areas in which data obtained by sampling the signal which has passed through the filter section 70 is stored. The memory section 80 includes a long-accumulation-time memory 81 which stores data of a signal which has passed through the high-sensitivity filter 71, and a short-accumulation-time memory 83 which stores data of a signal which has passed through the high-accuracy filter 73.

The long-accumulation-time memory 81 is a memory which stores signals over 20 milliseconds, and the short-accumulation-time memory 83 is a memory which stores signals over 10 milliseconds. Specifically, the capacity of the short-accumulation-time memory 83 is half of the capacity of the long-accumulation-time memory 81. The long-accumulation-time memory 81 is a storage section used for a coherent accumulation process with a coherent accumulation time of 20 milliseconds, and the short-accumulation-time memory 83 is a storage section used for a coherent accumulation process with a coherent accumulation time of 10 milliseconds, as described later.

With regard to the IF signal output from the RF reception circuit section 60, a flow S1 of the signal which passes through the high-sensitivity filter 71 and the long-accumulation-time memory 81 is called a "high-sensitivity system", and a flow S2 of the signal which passes through the high-accuracy filter 73 and the short-accumulation-time memory 83 is called a "high-accuracy system".

The baseband process circuit section 90 is a circuit section which performs pseudo-range calculations, positioning calculations, and the like by acquiring/extracting the GPS satellite signal from the IF signal stored in the memory section 80 and decoding data to acquire the navigation message, time information, and the like.

Figure 2:
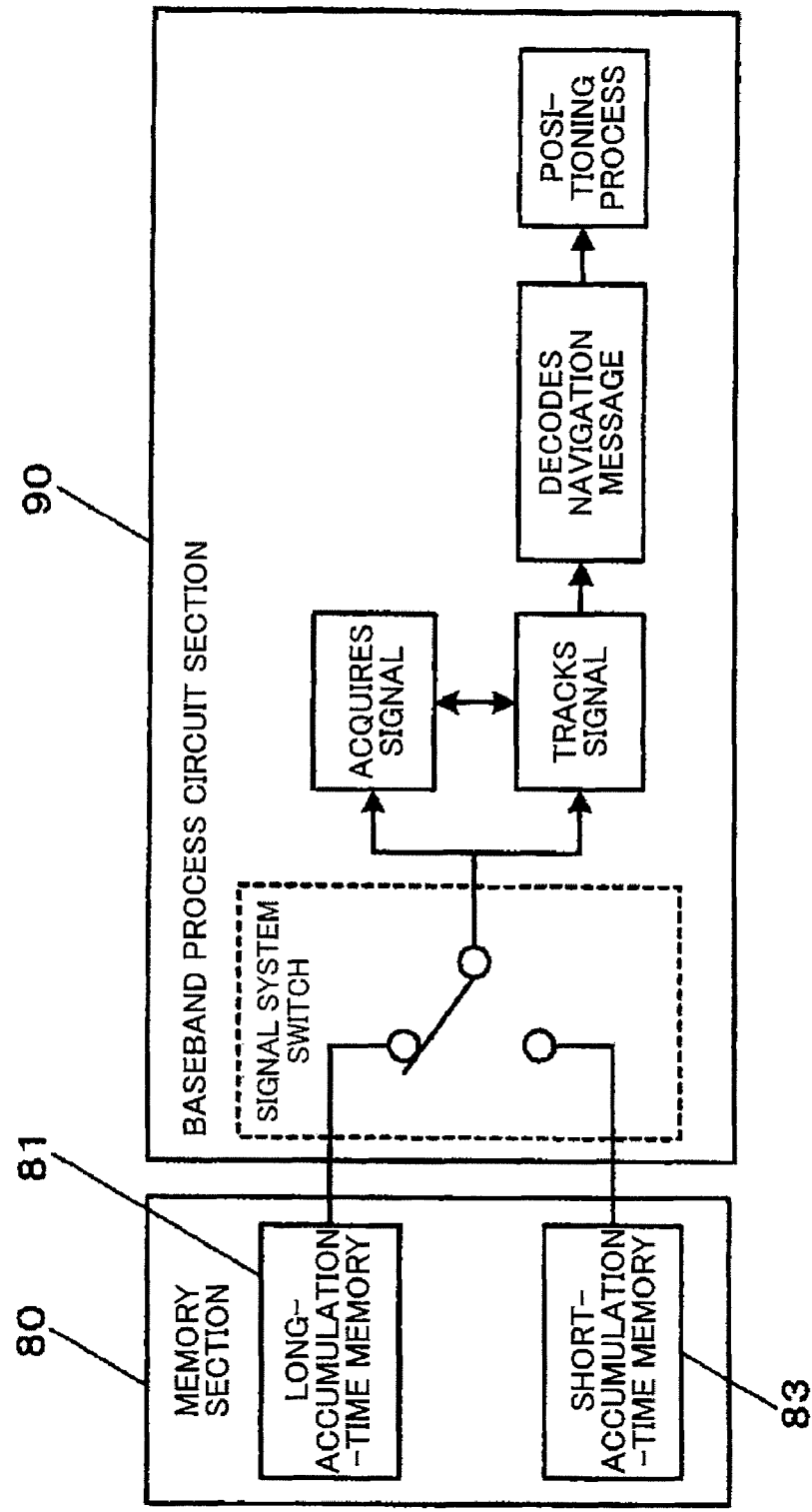
FIG. 2 is a view illustrative of the outline of a process performed by a baseband process circuit section.

FIG. 2 is a view illustrative of the outline of the process performed by the baseband process circuit section 90. The baseband process circuit section 90 alternatively selects the long-accumulation-time memory 81 or the short-accumulation-time memory 83 based on the signal strength of the received signal, and performs a positioning process based on the signal stored in the selected memory. In other words, the baseband process circuit section 90 switches the signal system used for the positioning process based on the signal strength of the received signal (hereinafter called "signal system switch process").

Specifically, the baseband process circuit section 90 performs the coherent accumulation process based on the signal stored in the memory corresponding to the currently set signal system each time a specific coherent accumulation time has expired. The coherent accumulation process is a calculation process of summing up the sums of squares of the component I and the component Q of the signals over the coherent accumulation time stored in the memory. A coherent cumulative value Pi is calculated according to the following expression (1).

$$Pi = I^2 + Q^2 \quad (1)$$

The character "i" indicates the coherent accumulation number. The coherent accumulation time is set at 20 milliseconds when the present signal system is the high-sensitivity system, and is set at 10 milliseconds when the present signal system is the high-accuracy system.

The baseband process circuit section 90 performs an incoherent accumulation process each time the positioning interval (e.g. 1 second) has expired. The incoherent accumulation process is a calculation process of summing up the coherent cumulative values Pi. A signal strength P is calculated according to the following expression (2).

$$P = \Sigma i Pi \quad (2)$$

Therefore, the sum of the coherent cumulative values Pi (i=1 to 100; when the positioning interval is 1 second) is the signal strength when the signal system is the high-accuracy system, and the sum of the coherent cumulative values fi (i=1 to 50; when the positioning interval is 1 second) is the signal strength when the signal system is the high-accuracy system.

The baseband process circuit section 90 determines whether or not the signal strength P calculated by the incoherent accumulation process is equal to or greater than a threshold value. When the signal strength P is equal to or greater than the threshold value, the baseband process circuit section 90 determines that a high-strength condition is satisfied, and switches the signal system to the high-accuracy system. When the signal strength P is less than the threshold value, the baseband process circuit section 90 determines that a low-strength condition is satisfied, and switches the signal system to the high-sensitivity system. The signal system switch process is described in detail in "1-2. Process flow".

The baseband process circuit section 90 acquires the GPS satellite signal based on the signal belonging to the switched signal system in addition to the signal system switch process. The baseband process circuit section 90 acquires the GPS satellite signal by extracting the GPS satellite signal from the IF signal. This process is implemented by subjecting the IF signal to a fast Fourier transform (FFT) calculation and the like to perform the correlation process. In more detail, the baseband process circuit section 90 calculates the correlation value of the pseudo-generated spread code (code replica) and the IF signal by performing the coherent accumulation process, and specifies the carrier frequency of the received signal by extracting the frequency component with the largest amplitude.

In the coherent accumulation process when calculating the correlation value, the baseband process circuit section 90 performs the accumulation process using a coherent accumulation time of 20 milliseconds when the signal system is the high-sensitivity system, or a coherent accumulation time of 10 milliseconds when the signal system is the high-accuracy system. The coherent accumulation time when the signal system is the high-sensitivity system is set to be twice the coherent accumulation time when the signal system is the high-accuracy system because the amplitude of noise contained in the signal can be attenuated by increasing the coherent accumulation time.

When the GPS satellite signal has been acquired, the baseband process circuit section 90 tracks the acquired GPS satellite signal. The baseband process circuit section 90 tracks the GPS satellite signals by synchronously holding the acquired GPS satellite signals in parallel. For example, this process is implemented by tracking the phases of the C/A code and the carrier included in the satellite signal using a code loop known as a delay locked loop (DLL) and a carrier loop known as a phase locked loop (PLL).

The baseband process circuit section 90 decodes the data included in the GPS satellite signal to acquire the navigation message, and locates the present position of the portable telephone 1 by performing pseudo-range calculations, positioning calculations, and the like (hereinafter called "positioning process").

The baseband process circuit section 90 includes a circuit which performs the correlation process, a circuit which generates the spread code (code replica) for performing correlation calculations, a circuit which decodes data, a CPU 91 which controls each section of the baseband process circuit section 90 and the RF reception circuit section 60 and performs various calculation processes including a baseband process described later, a ROM 93, and a RAM 95.

Figure 3A:
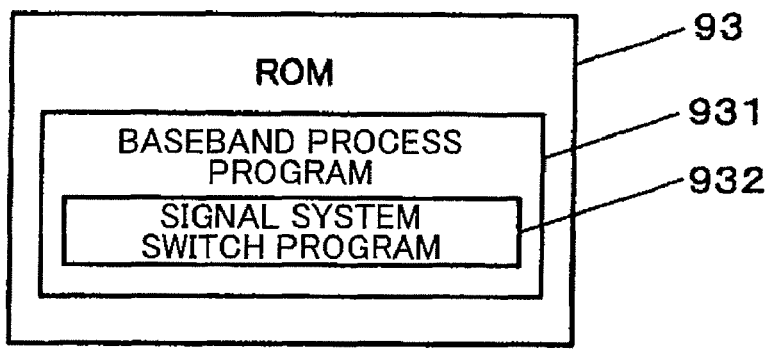
FIG. 3A is a view showing the configuration of a ROM.
Figure 3B:
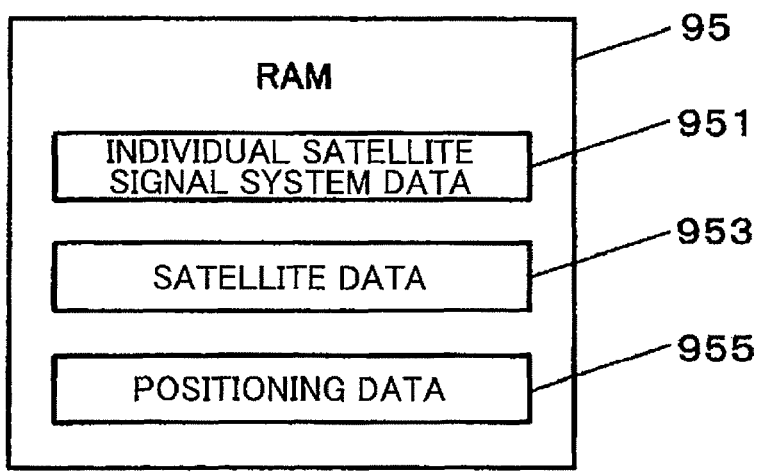
FIG. 3B is a view showing the configuration of a RAM.

FIGS. 3A and 3B are views showing examples of data stored in the ROM 93 and the RAM 95 included in the baseband process circuit section 90. The ROM 93 stores a baseband process program 931 which is read by the CPU 91 and executed as the baseband process (see FIG. 6). A signal system switch program 932 executed as the signal system switch process (see FIG. 7) is included in the baseband process program 931 as a subroutine.

The baseband process is a process in which the CPU 91 switches the signal system used for positioning from the signal received from each acquisition target GPS satellite (hereinafter called "acquisition target satellite"), and locates the present position of the portable telephone 1 by performing the positioning process based on the signal belonging to the switched signal system. The baseband process is described later in detail using a flowchart.

The signal system switch process is a process in which the CPU 91 calculates the signal strength of the signal received from each acquisition target satellite according to the positioning time interval (hereinafter called "positioning interval"), and switches the signal system as a result of determining whether or not the signal strength is equal to or greater than the threshold value. The signal system switch process is also described later in detail using a flowchart.

The RAM 95 stores satellite signal system data 951, satellite data 953, and positioning data 955.

Figure 4:
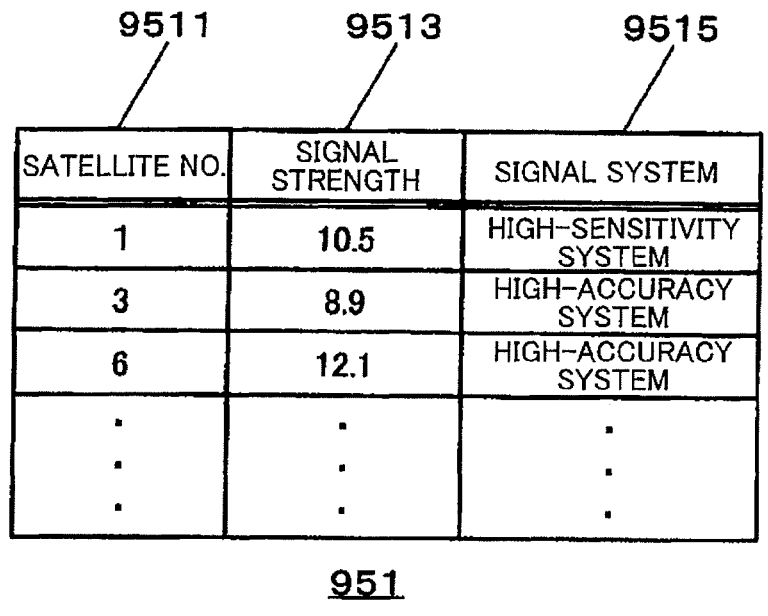
FIG. 4 is a view showing a data configuration example of satellite signal system data.

FIG. 4 is a view showing a data configuration example of the satellite signal system data 951. In the satellite signal system data 951, an acquisition target satellite number 9511, a signal strength 9513 of the signal received from the acquisition target satellite, and a signal system 9515 currently set for the acquisition target satellite are stored while being associated with one another.

Figure 5:
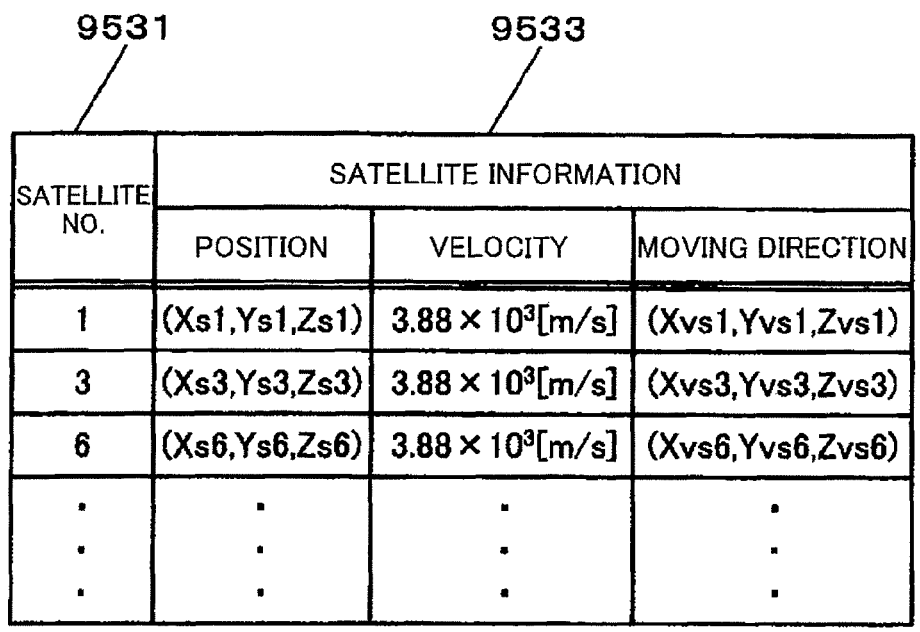
FIG. 5 is a view showing a data configuration example of satellite data.

FIG. 5 is a view showing a data configuration example of the satellite data 953. In the satellite data 953, an acquisition target satellite number 9531 and satellite information 9533 including the position, the velocity, and the moving direction of the acquisition target satellite are stored while being associated with each other. The position of the acquisition target satellite is indicated by three-dimensional coordinates in the terrestrial reference frame, and the moving direction is indicated by a three-dimensional unit vector in the terrestrial reference frame, for example. The satellite data 953 is updated each time the satellite information is calculated in the baseband process.

The positioning data 955 is data of the located position of the portable telephone 1. For example, three-dimensional coordinates in the terrestrial reference frame are stored as the positioning data 955. The present position calculated by the positioning process during the baseband process is stored as the positioning data 955 in time series.

The host CPU 110 is a processor which controls each section of the portable telephone 1 according to various programs such as a system program stored in the ROM 150. The host CPU 110 mainly controls the telephone function and causes the display section 130 to display a navigation screen in which the present position of the portable telephone 1 located by the baseband process circuit section 90 is plotted.

The operation section 120 is an input device including an operation key, a button switch, and the like, and outputs a press signal to the host CPU 110. Various instruction inputs such as a telephone call request or a navigation screen display request are performed by the operation of the operation section 120.

The display section 130 is a display device which includes a liquid crystal display (LCD) or the like and displays various images based on a display signal input from the host CPU 110. The display section 130 displays date/time information, the navigation screen, and the like.

The portable wireless communication section 140 is a known communication circuit section implemented by an antenna through which a radio signal is transmitted and received between the portable wireless communication section 140 and a radio base station installed by a portable telephone communication service provider, an RF converter, and the like. The portable wireless communication section 140 transmits and receives a radio signal under control of the host CPU 110 to implement a telephone call and e-mail transmission/reception.

The ROM 150 is a read-only storage device. The ROM 150 stores data and various programs such as a system program for controlling the portable telephone 1, a program for implementing a telephone call and e-mail transmission/reception, and a program for implementing a navigation function. The host CPU 110 performs the processes according to the programs and the data.

The RAM 160 is a readable/writable storage device. The RAM 160 forms a work area for temporarily storing the system program executed by the host CPU 110, various processing programs, data during various processes, processing results, and the like.

1.2 Process Flow

Figure 6:
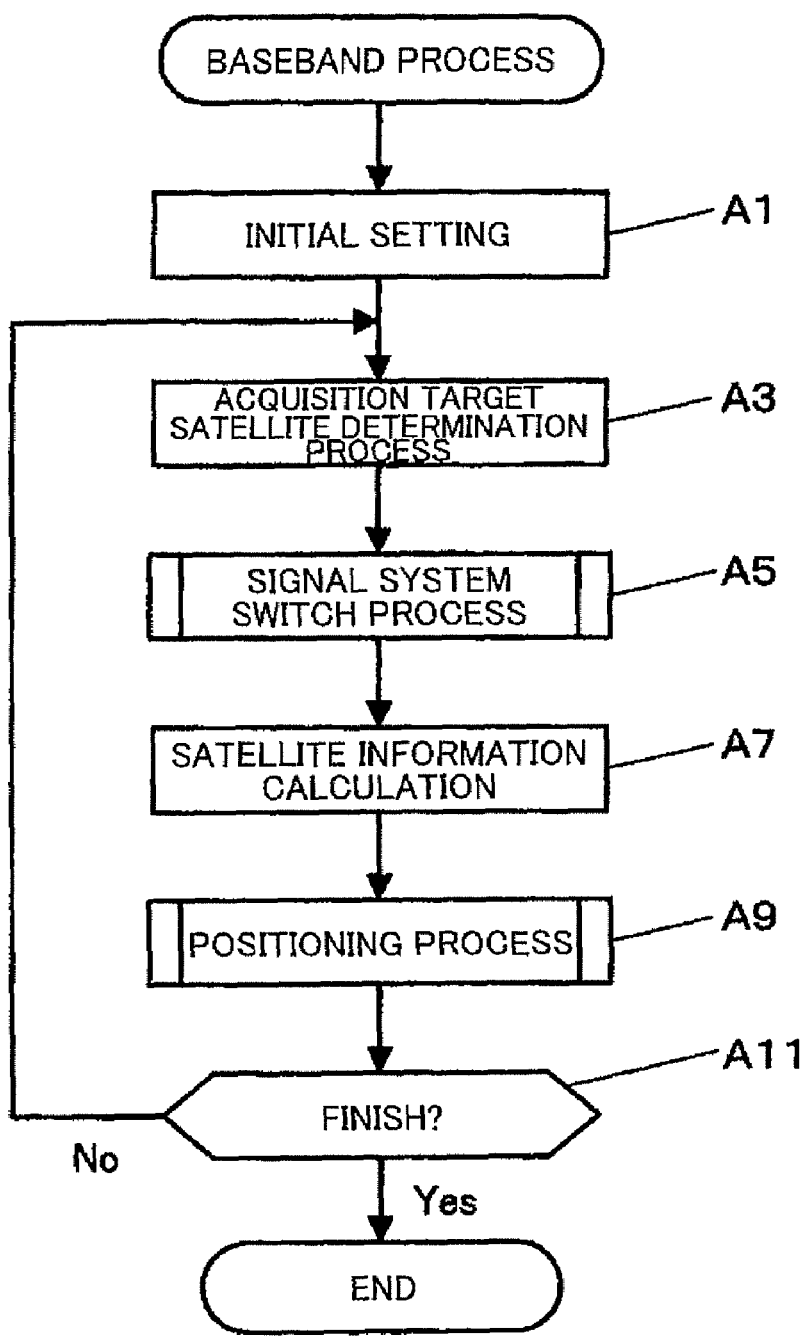
FIG. 6 is a flowchart showing the flow of a baseband process.

FIG. 6 is a flowchart showing the flow of the baseband process performed by the baseband process circuit section 90 by causing the CPU 91 to read and execute the baseband process program 931 stored in the ROM 93. In the baseband process, after reception of the RF signal through the GPS antenna 10, down-conversion of the RF signal into the IF signal by the RF reception circuit section 60, and the like, the GPS reception section 20 is in a state in which the data of the signal which has passed through the filter section 70 is stored in the memory section 80 at any time.

Although not shown, the CPU 91 acquires and tracks the GPS satellite signal by subjecting the signal belonging to the currently set signal system to FFT calculations and the like and performing the correlation process by executing the coherent accumulation process, separately from the signal system switch process.

The CPU 91 performs the following initial settings (step A1). Specifically, the CPU 91 sets the signal systems 9515 of all of the GPS satellites to be the high-accuracy system, and stores the high-accuracy system as the satellite signal system data 951 stored in the RAM 95. The CPU 91 also sets "every second" (positioning interval) as the timing at which the signal system is switched (hereinafter called "signal system switch timing").

The CPU 91 performs the acquisition target satellite determination process (step A3). Specifically, the CPU 91 determines the GPS satellite from which the GPS satellite signal can be received based on the orbital information of the GPS satellite such as an almanac, and adds a new acquisition target satellite or excludes the GPS satellite considered to be positioned outside the acquisition range from the acquisition target satellites. The CPU 91 performs the signal system switch process by reading and executing the signal system switch program 932 stored in the ROM 93 (step A5).

Figure 7:
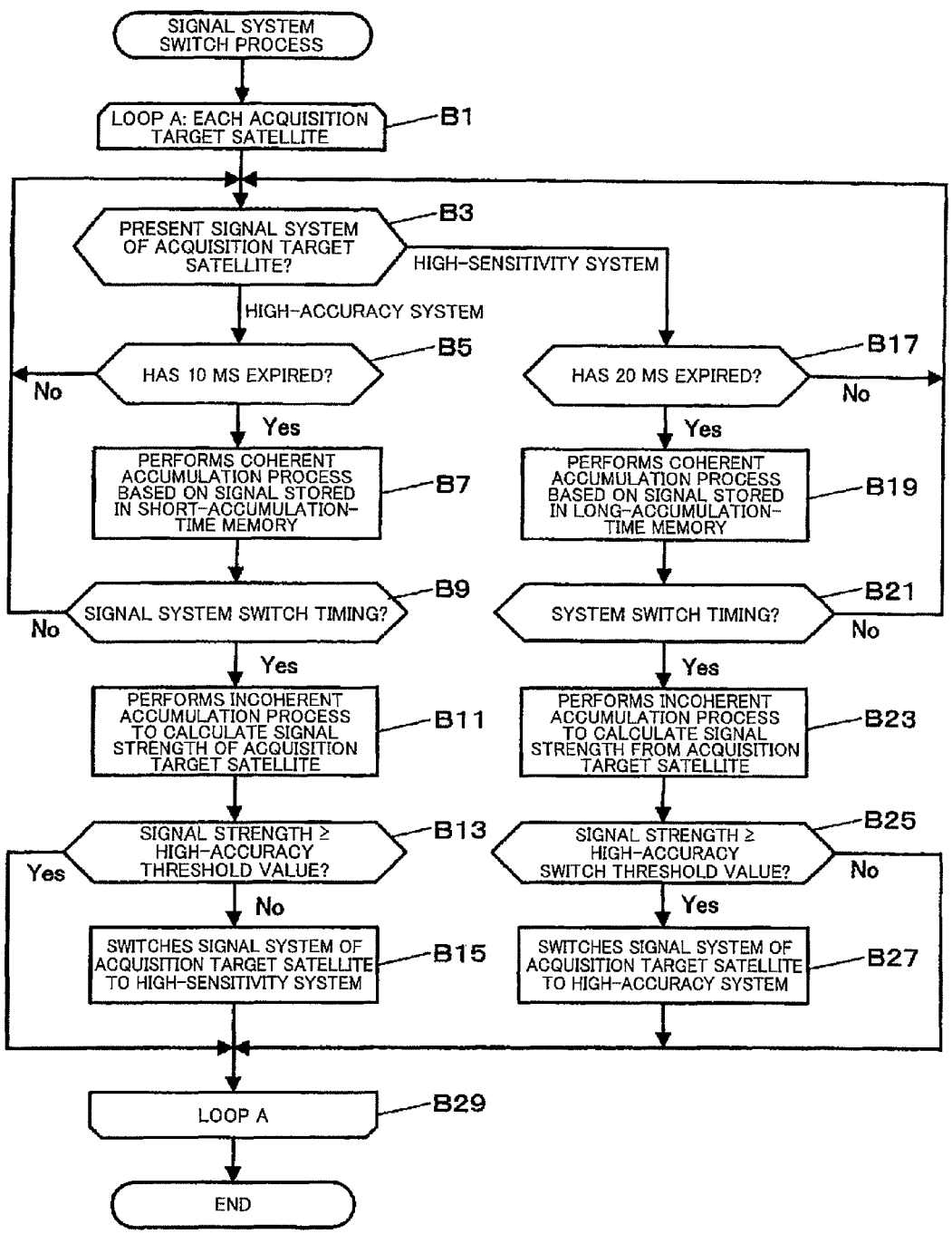
FIG. 7 is a flowchart showing the flow of a signal system switch process.

FIG. 7 is a flowchart showing the flow of the signal system switch process.

The CPU 91 executes a loop A in units of the acquisition target satellites (steps B1 to B29). In the loop A, the CPU 91 determines the present signal system 9515 of the acquisition target satellite contained in the satellite signal system data 951 in the RAM 95 (step B3). When the CPU 91 has determined the present signal system 9515 is the high-accuracy system (step B3: high-accuracy system), the CPU 91 determines whether or not 10 milliseconds (coherent accumulation time) has expired (step B5).

When the CPU 91 has determined that 10 milliseconds has not expired (step B5: No), the CPU 91 returns to the step B3. When the CPU 91 has determined that 10 milliseconds has expired (step B5: Yes), the CPU 91 calculates the coherent cumulative value Pi by performing the coherent accumulation process with a coherent accumulation time of 10 milliseconds based on the signal stored in the short-accumulation-time memory 83 of the memory section 80 (step B7).

The CPU 91 determines whether or not the signal system switch timing has been reached (step B9). When the CPU 91 has determined that the signal system switch timing has not been reached (step B9: No), the CPU 91 returns to the step B3. When the CPU 91 has determined that the signal system switch timing has been reached (step B9: Yes), the CPU 91 performs the incoherent accumulation process to calculate the signal strength P of the signal received from the acquisition target satellite (step B11), and updates the satellite signal system data 951 in the RAM 95.

The CPU 91 determines whether or not the calculated signal strength is equal to or greater than a specific high-accuracy threshold value (step B13). When the CPU 91 has determined that the calculated signal strength is equal to or greater than the high-accuracy threshold value (step B13: Yes), the CPU 91 processes the next acquisition target satellite. When the CPU 91 has determined that the calculated signal strength is less than the high-accuracy threshold value (step B13: No), the CPU 91 switches the signal system 9515 of the acquisition target satellite to the high-sensitivity system (step B15) to update the satellite signal system data 951 in the RAM 95. The CPU 91 then processes the next acquisition target satellite.

When the CPU 91 has determined that the signal system 9515 of the acquisition target satellite is the high-sensitivity system in the step B3 (step B3; high-sensitivity system), the CPU 91 determines whether or not 20 milliseconds (coherent accumulation time) has expired (step B17).

When the CPU 91 has determined that 20 milliseconds has not expired (step B17: No), the CPU 91 returns to the step B3. When the CPU 91 has determined that 20 milliseconds has expired (step B17: Yes), the CPU 91 calculates the coherent cumulative value Pi by performing the coherent accumulation process with a coherent accumulation time of 20 milliseconds based on the signal stored in the long-accumulation-time memory 81 of the memory section 80 (step B19).

The CPU 91 determines whether or not the signal system switch timing has been reached (step B21). When the CPU 91 has determined that the signal system switch timing has not been reached (step B21: No), the CPU 91 returns to the step B3. When the CPU 91 has determined that the signal system switch timing has been reached (step B21: Yes), the CPU 91 performs the incoherent accumulation process to calculate the signal strength P of the signal received from the acquisition target satellite (step B23), and updates the satellite signal system data 951 in the RAM 95.

The CPU 91 determines whether or not the calculated signal strength is equal to or greater than a specific high-accuracy switch threshold value (step B25). When the CPU 91 has determined that the calculated signal strength is less than the high-accuracy switch threshold value (step B25: No), the CPU 91 determines that the signal system is the high-sensitivity system, and processes the next acquisition target satellite.

When the CPU 91 has determined that the calculated signal strength is equal to or greater than the high-accuracy switch threshold value (step B25: Yes), the CPU 91 switches the signal system 9515 of the acquisition target satellite to the high-accuracy system (step B27) to update the satellite signal system data 951 in the RAM 95. The CPU 91 then processes the next acquisition target satellite. After the CPU 91 has performed the above process for all of the acquisition target satellites, the CPU 91 finishes the loop A and finishes the signal system switch process.

Again referring to the baseband process shown in FIG. 6, after completion of the signal system switch process, the CPU 91 acquires the navigation message from the signal belonging to the signal system 9515 of each acquisition target satellite contained in the satellite signal system data 951 in the RAM 95. The CPU 91 calculates the position, the velocity, and the moving direction of each acquisition target satellite based on the navigation message to obtain the satellite information 9533 (step A7), and stores the satellite information 9533 as the satellite data 953 in the RAM 95 while associating the satellite information 9533 with the acquisition target satellite number 9531.

The CPU 91 performs known positioning calculations based on the satellite information 9533 calculated in the step A7, and locates the present position of the portable telephone 1 (step A9). The CPU 91 stores the located present position as the positioning data 955 in the RAM 95.

The CPU 91 determines whether or not to finish the process (step A11). Specifically, the CPU 91 determines to finish the process when a process finish signal is input from the host CPU 110 in response to an instruction operation of disabling the navigation function or an instruction operation of removing power from the portable telephone 1, for example.

When the CPU 91 has determined to continue the process (step C9: No), the CPU 91 returns to the step A3. When the CPU 91 has determined to finish the process (step A11: Yes), the CPU 91 finishes the baseband process.

1.3 Effect

According to this embodiment, the signals output from the filters included in the filter section 70 and differing in passband are respectively stored in different memories of the memory section 80, and the positioning process is performed based on the signal stored in the memory. Specifically, the signal strength of the received signal is calculated by the coherent accumulation process and the incoherent accumulation process, and the signal system used for positioning is alternatively switched to the high-sensitivity system S1 or the high-accuracy system S2 as a result of determining whether or not the signal strength is equal to or greater than the threshold value. Therefore, it is possible to pursue sensitivity when the signal reception state is relatively poor by switching the signal system to the high-sensitivity system, and to pursue accuracy when the signal reception state is relatively good by switching the signal system to the high-accuracy system.

1-4. Modification 1-4-1. Host CPU

The host CPU 110 may perform some or all of the processes performed by the CPU 91 of the baseband process circuit section 90 by means of software. For example, the host CPU 110 may perform the signal system switch process, and the CPU 91 of the baseband process circuit section 90 may perform the acquisition/tracking process of the GPS satellite signal, the positioning process, and the like based on the signal belonging to the signal system switched by the host CPU 110. The host CPU 110 may perform the positioning process based on the GPS satellite signal acquired and tracked by the CPU 91.

1-4-2. RF Reception Circuit Section

This embodiment has been described above taking an example in which the RF reception circuit section 60 and the filter section 70 are separately provided. Note that the filter section 70 may be incorporated in the RF reception circuit section 60. In this case, the filter section 70 may be formed using a digital filter, and the IF signal may be converted into a digital signal and then caused to pass through the filter section 70. Alternatively, the filter section 70 may be formed using an analog filter, and the IF signal may be caused to pass through the filter section 70 and then converted into a digital signal.

1-4-3. Signal System Switch Timing

This embodiment has been described above taking an example in which the signal system switch timing occurs every second (positioning interval). Note that the signal system switch timing may occur every 20 milliseconds which is the coherent accumulation time when the signal system is the high-sensitivity system, or may occur every 10 milliseconds which is the coherent accumulation time when the signal system is the high-accuracy system.

Alternatively, the signal system may be switched when the acquisition target satellite has changed. Specifically, the signal system switch determination is not performed when the number or type of satellites currently determined to be the acquisition target in the acquisition target satellite determination process is the same as that of the satellites previously determined to be the acquisition target, and the signal system switch determination is performed when the number or type of satellites currently determined to be the acquisition target differs from that of the satellites previously determined to be the acquisition target. The positioning process is performed based on the signal belonging to the switched signal system.

1-4-4. Signal System

This embodiment has been described above taking an example in which the number of signal systems is two (i.e., high-sensitivity system and high-accuracy system). Note that the number of signal systems may be three or more. Specifically, the filter section is formed using three bandpass filters which differ in cut-off frequency, and the memory section is formed using three memories storing the signals output from the respective filters. Three value ranges (conditions) which should be satisfied by the signal strength are set as the signal system switch conditions (switch conditions), and the signal system is switched depending on the range in which the signal strength calculated by the incoherent accumulation process is included.

In this case, the bandpass filters are designed to have a passband inclusion relationship in the same manner as in the first embodiment. The amplitude of noise with respect to the signal can be generally more attenuated as the coherent accumulation time increases, whereby the sensitivity increases. Therefore, if the coherent accumulation process is performed with a longer coherent accumulation time for the signal stored in the memory corresponding to the filter with a narrower passband, the sensitivity can be increased due to the longer coherent accumulation time in addition to an increase in sensitivity due to the narrower band.

1-4-5. Switch Condition

This embodiment has been described above taking an example in which the signal system of each acquisition target satellite is switched as a result of determining whether or not the high-strength condition or the low-strength condition is satisfied by determining whether or not the present signal strength is equal to or greater than the threshold value. Note that the signal system may be switched based on the history of the signal strength. Specifically, the signal system is switched to the high-sensitivity system when the signal strength has been consecutively determined to be less than the high-accuracy threshold value 10 times, and the signal system is switched to the high-accuracy system when the signal strength has been consecutively determined to be equal to or greater than the high-accuracy threshold value 10 times, for example.

1-4-6. Threshold Value

The threshold value (high-accuracy switch threshold value) of the signal strength of the signal belonging to the high-sensitivity system may be the same as or different from the threshold value (high-accuracy threshold value) of the signal strength of the signal belonging to the high-accuracy system. For example, the high-accuracy switch threshold value may be set higher than the high-accuracy threshold value from the viewpoint of preventing frequent switching between the high-sensitivity system and the high-accuracy system (so-called hunting).

2. Second Embodiment 2-1. Configuration and Operation

Figure 8:
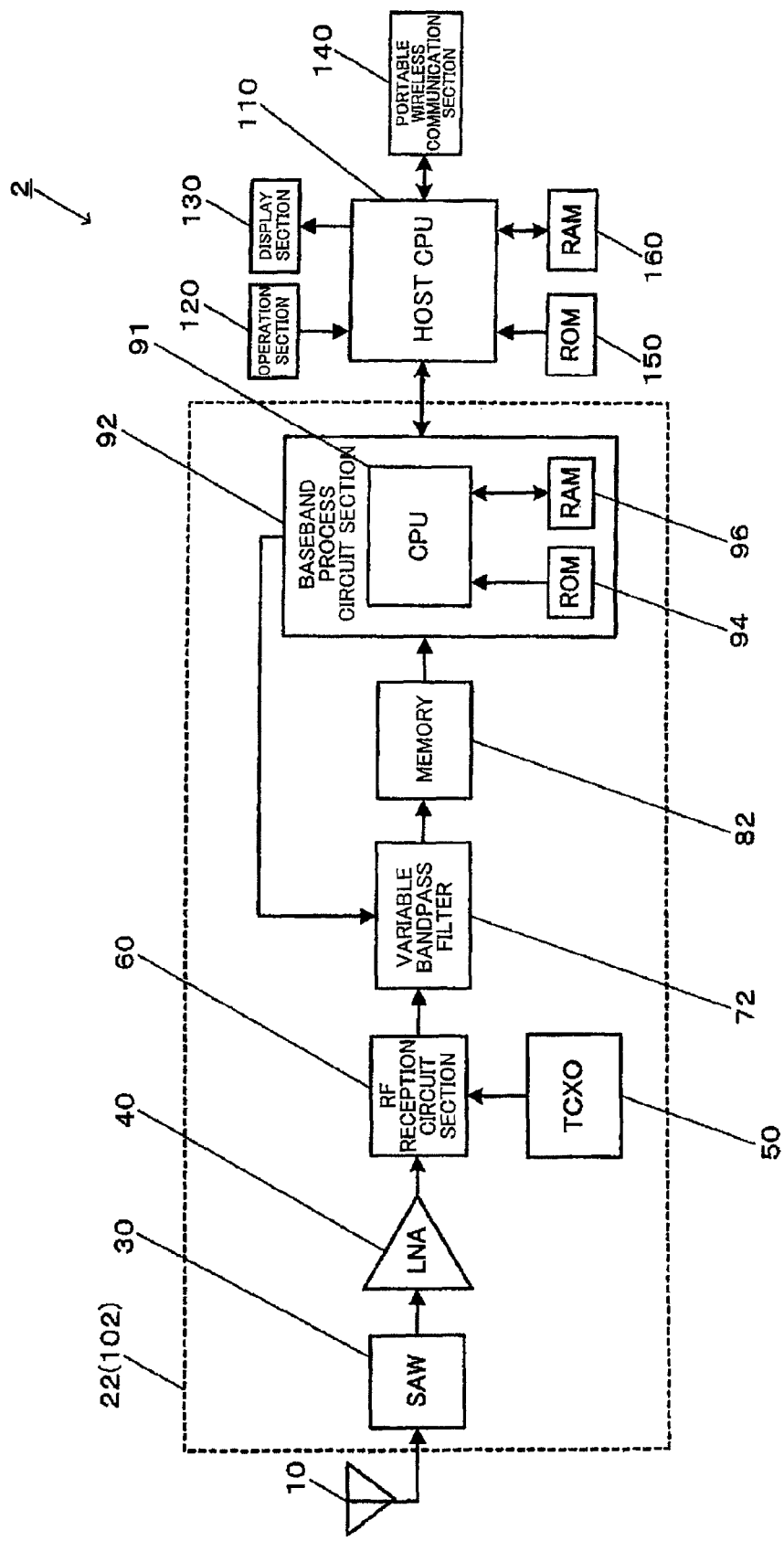
FIG. 8 is a block diagram showing the configuration of a portable telephone according to a second embodiment.

FIG. 8 is a block diagram showing the functional configuration of a portable telephone 2 according to a second embodiment. The portable telephone 2 includes a GPS antenna 10, a GPS reception section 22, a CPU 110, an operation section 120, a display section 130, a portable wireless communication section 140, a ROM 150, and a RAM 160. Note that the same sections as those of the portable telephone 1 according to the first embodiment are indicated by the same symbols. Description of these sections is omitted.

The GPS reception section 22 is a circuit section including a SAW section 30, an LNA 40, a TCXO 50, an RF reception circuit section 60, a variable bandpass filter 72, a memory 82, and a baseband process circuit section 90, and forms a positioning device 102 which is a characteristic configuration according to this embodiment.

The variable bandpass filter 72 is a filter which allows the frequency band component of the IF signal output from the RF reception circuit section 60 passing through to be changed. In this embodiment, the variable bandpass filter 72 is switched between a high-sensitivity band which is a high-sensitivity passband and a high-accuracy band which is a high-accuracy passband. The high-sensitivity band is a passband with a cut-off frequency of 1 MHz, and the high-accuracy band is a passband with a cut-off frequency of 2 MHz, for example.

The memory 82 is a circuit section which stores a signal which has passed through the variable bandpass filter 72. For example, the memory 82 stores data of signals over 20 milliseconds.

The portable telephone 2 differs from the portable telephone 1 in that the signal system is not switched in units of the acquisition target satellites since the signal output from the RF reception circuit section 60 reaches the baseband process circuit section 92 through one path. Specifically, the signal from which the same frequency band component is attenuated/removed is used for positioning regardless of the acquisition target satellites.

The baseband process circuit section 92 acquires/tracks the GPS satellite signal by performing the correlation process by subjecting the IF signal which has passed through the variable bandpass filter 72 to FFT calculations and the like while changing the passband of the variable bandpass filter 72 based on the average value of the signal strengths of the signals received from the acquisition target satellites. The baseband process circuit section 92 acquires the navigation message, time information, and the like by decoding the data of the acquired GPS satellite signal and performs pseudo-range calculations, positioning calculations, and the like.

The baseband process circuit section 92 acquires the GPS satellite signal by performing the coherent accumulation process in the same manner as in the first embodiment. In this case, the coherent accumulation time is set at 20 milliseconds when the passband of the variable bandpass filter 72 is the high-sensitivity band, and is set at 10 milliseconds when the passband of the variable bandpass filter 72 is the high-accuracy band. Specifically, the baseband process circuit section 92 acquires the GPS satellite signal and performs the positioning process by performing the coherent accumulation process with a longer coherent accumulation time as the set passband of the variable bandpass filter 72 becomes narrower.

This is because the amplitude of noise can be attenuated by increasing the coherent accumulation time to achieve a further increase in sensitivity, as described in the first embodiment.

In this embodiment, the baseband process circuit section 92 includes a CPU 91 which performs various calculation processes including a second baseband process described later, a ROM 94, and a RAM 96.

Figure 9A:
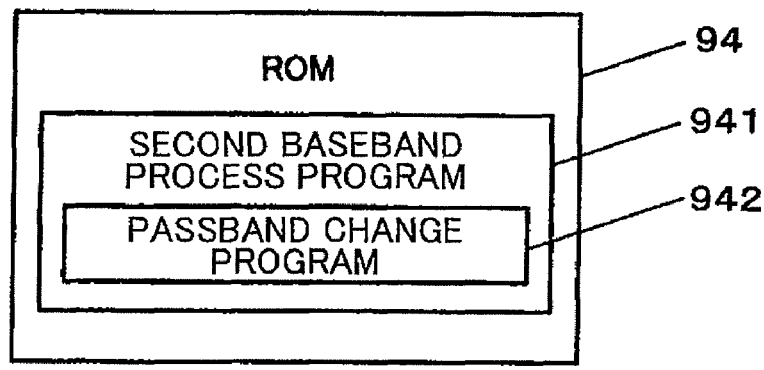
FIG. 9A is a view showing the configuration of a ROM.
Figure 9B:
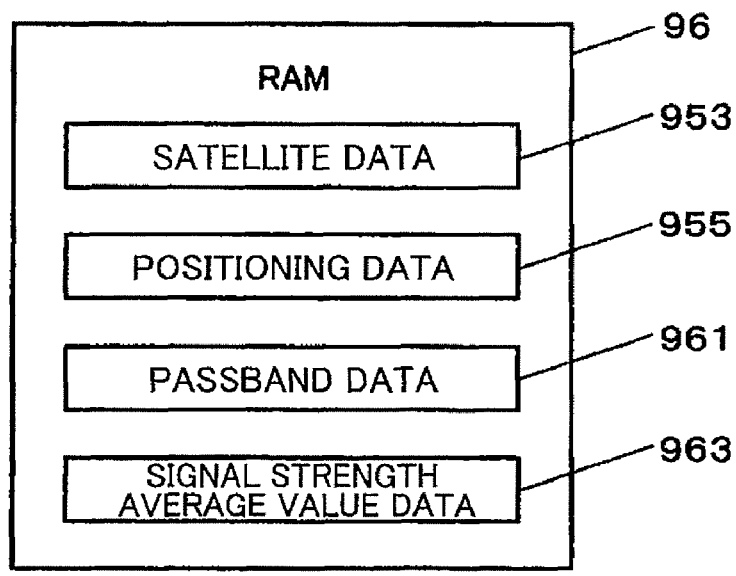
FIG. 9B is a view showing the configuration of a RAM.

FIGS. 9A and 9B are views showing examples of data stored in the ROM 94 and the RAM 96 included in the baseband process circuit section 92. The ROM 94 stores a second baseband process program 941 which is read by the CPU 91 and executed as the second baseband process (see FIG. 10). A passband change program 942 executed as a passband change process (see FIG. 11) is included in the second baseband process program 941 as a subroutine.

The second baseband process is a process in which the CPU 91 locates the present position of the portable telephone 1 by changing the passband of the variable bandpass filter 72 and performing the positioning process based on the signal which has passed through the variable bandpass filter 72. The second baseband process is described later in detail using a flowchart.

The passband change process is a process in which the CPU 91 calculates the average value (hereinafter called "signal strength average value") of the signal strengths of the signals received from the acquisition target satellites according to the positioning interval, and changes the passband of the variable bandpass filter 72 by determining whether or not the signal strength average value is equal to or greater than a threshold value. The passband change process is also described later in detail using a flowchart.

The RAM 96 stores satellite data 953, positioning data 955, passband data 961, and signal strength average value data 963.

The passband data 961 is data of the present passband of the variable bandpass filter 72. The high-sensitivity band or the high-accuracy band is stored as the passband. The passband data 961 is updated each time the passband is changed in the passband change process.

The signal strength average value data 963 is data in which the signal strength average value is stored. The signal strength average value data 963 is updated each time the signal strength average value is calculated in the passband change process.

2-2. Process Flow

Figure 10:
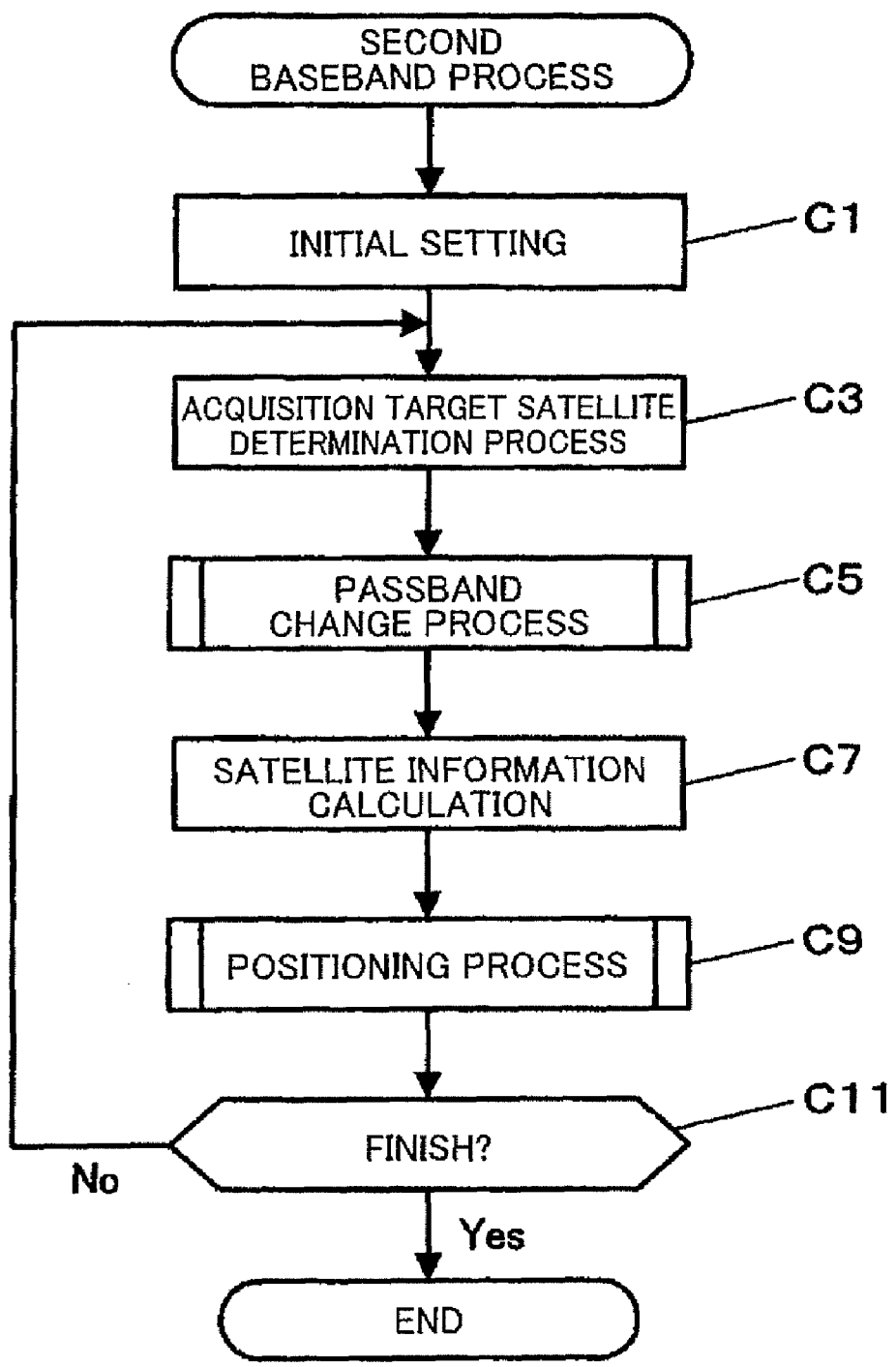
FIG. 10 is a flowchart showing the flow of a second baseband process.

FIG. 10 is a flowchart showing the flow of the second baseband process performed by causing the CPU 91 to read and execute the second baseband process program 941 stored in the ROM 94.

The CPU 91 performs the following initial settings (step C1). Specifically, the CPU 91 sets the passband of the variable bandpass filter 72 to be the high-accuracy band, and stores the high-accuracy band in the passband data 961 in the RAM 96. The CPU 91 also sets "every second" (positioning interval) as the timing at which the passband of the variable bandpass filter 72 is changed (hereinafter called "passband change timing").

The CPU 91 performs the acquisition target satellite determination process (step C3). Specifically, the CPU 91 determines the GPS satellite from which the GPS satellite signal can be received based on the orbital information of the GPS satellite such as an almanac, and adds a new acquisition target satellite or excludes the GPS satellite considered to be positioned outside the acquisition range from the acquisition target satellites. The CPU 91 performs the passband change process by reading and executing the passband change program 942 in the ROM 94 (step C5).

Figure 11:
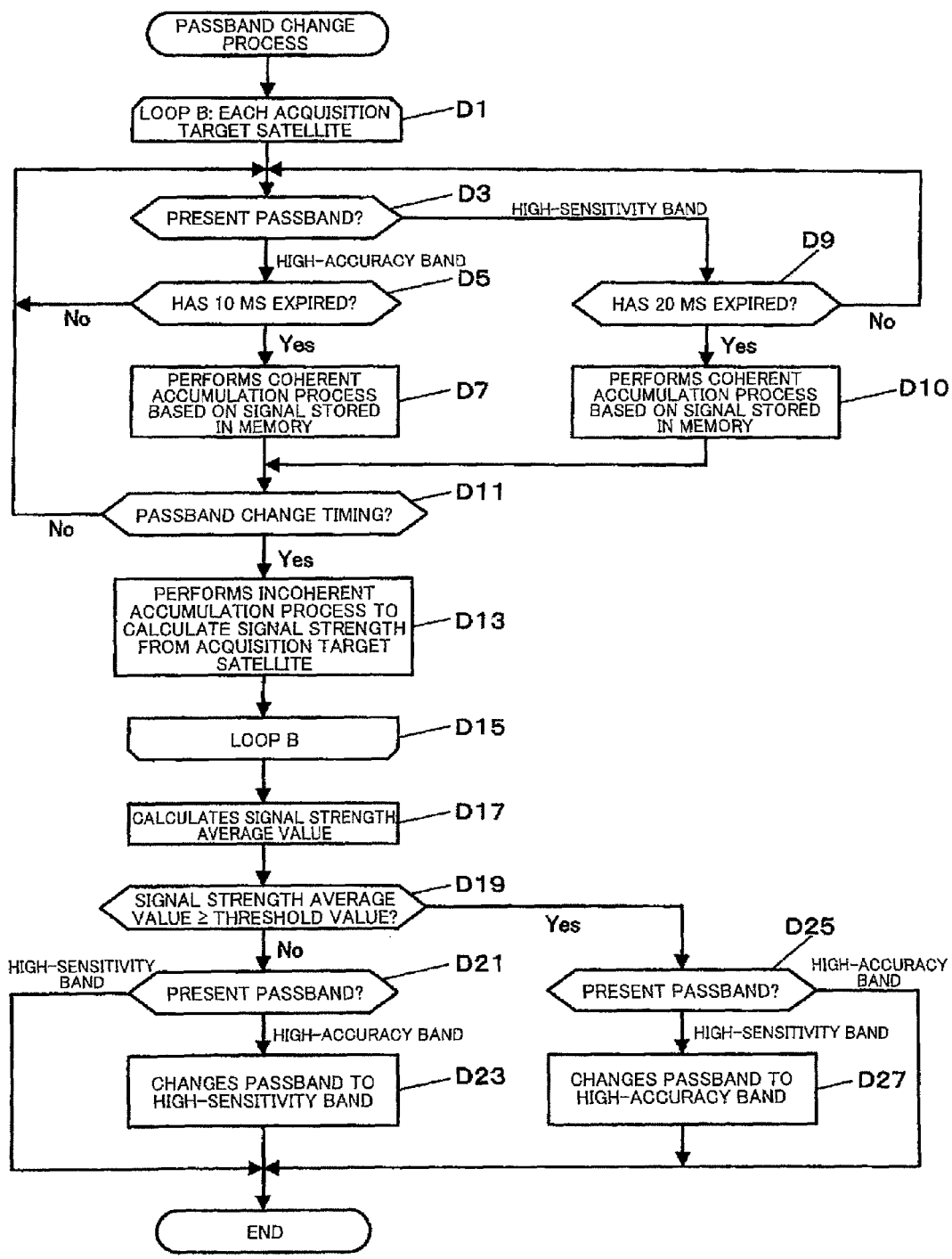
FIG. 11 is a flowchart showing the flow of a passband change process.

FIG. 11 is a flowchart showing the flow of the passband change process.

The CPU 91 executes a loop B in units of the acquisition target satellites (steps D1 to D15). In the loop B, the CPU 91 determines the present passband of the variable bandpass filter 72 stored in the passband data 961 in the RAM 96 (step D3). When the CPU 91 has determined the present passband is the high-accuracy band (step D3: high-accuracy band), the CPU 91 determines whether or not 10 milliseconds (coherent accumulation time) has expired (step D5).

When the CPU 91 has determined that 10 milliseconds has not expired (step D5: No), the CPU 91 returns to the step D3. When the CPU 91 has determined that 10 milliseconds has expired (step D5: Yes), the CPU 91 calculates the coherent cumulative value Pi by performing the coherent accumulation process with a coherent accumulation time of 10 milliseconds based on the signal stored in the memory 82 (step D7).

When the CPU 91 has determined that the present passband of the variable bandpass filter 72 is the high-sensitivity band in the step D3 (step D3; high-sensitivity band), the CPU 91 determines whether or not 20 milliseconds (coherent accumulation time) has expired (step D9).

When the CPU 91 has determined that 20 milliseconds has not expired (step D9: No), the CPU 91 returns to the step D3. When the CPU 91 has determined that 20 milliseconds has expired (step D9: Yes), the CPU 91 calculates the coherent cumulative value Pi by performing the coherent accumulation process with a coherent accumulation time of 20 milliseconds based on the signal stored in the memory 82 (step D10).

After the CPU 91 has performed the coherent accumulation process in the step D7 or D10, the CPU 91 determines whether or not the passband change timing has been reached (step D11). Specifically, the CPU 91 determines whether or not 1 second (positioning interval) has expired.

When the CPU 91 has determined that the passband change timing has not been reached (step D11: No), the CPU 91 returns to the step D3. When the CPU 91 has determined that the passband change timing has been reached (step D11: Yes), the CPU 91 performs the incoherent accumulation process to calculate the signal strength P of the signal received from the acquisition target satellite (step D13). After the CPU 91 has performed the above process for all the acquisition target satellites, the CPU 91 finishes the loop B.

After completion of the loop B, the CPU 91 calculates the signal strength average value by averaging the signal strength P of each acquisition target satellite calculated in the step D13 (step D17), and stores the signal strength average value in the signal strength average value data 963 in the RAM 96.

The CPU 91 determines whether or not the calculated signal strength average value is equal to or greater than a specific threshold value (step D19). When the CPU 91 has determined that the calculated signal strength average value is less than the threshold value (step D19: No), the CPU 91 determines the present passband of the variable bandpass filter 72 stored in the passband data 961 in the RAM 96 (step D21).

When the CPU 91 has determined that the present passband is the high-accuracy band (step D21; high-accuracy band), the CPU 91 changes the passband of the variable bandpass filter 72 to the high-sensitivity band (step D23) to update the passband data 961 in the RAM 96, and finishes the passband change process.

When the CPU 91 has determined that the signal strength average value is equal to or greater than the threshold value in the step D19 (step D19; Yes), the CPU 91 determines the present passband of the variable bandpass filter 72 stored in the passband data 961 in the RAM 96 (step D25).

When the CPU 91 has determined that the present passband is the high-sensitivity band (step D25; high-sensitivity band), the CPU 91 changes the passband of the variable bandpass filter 72 to the high-accuracy band (step D27) to update the passband data 961 in the RAM 96, and finishes the passband change process.

When the CPU 91 has determined that the present passband is the high-sensitivity band in the step D21 (step D21; high-sensitivity band), or has determined that the present passband is the high-accuracy band in the step D25 (step D25; high-accuracy band), the CPU 91 finishes the passband change process.

Again referring to the second baseband process shown in FIG. 10, after completion of the passband change process, the CPU 91 acquires the navigation message from the signal which has passed through the variable bandpass filter 72. The CPU 91 calculates the satellite information 9533 of each acquisition target satellite based on the navigation message (step C7), and updates the satellite data 953 in the RAM 96.

The CPU 91 performs known positioning calculations based on the satellite information calculated in the step C7 to locate the present position of the portable telephone 1 (step C9). The CPU 91 stores the located present position in the positioning data 955 in the RAM 96.

The CPU 91 determines whether or not to finish the process (step C11). When the CPU 91 does not finish the process (step C11: No), the CPU 91 returns to the step C3. When the CPU 91 finishes the process (step C11: Yes), the CPU 91 finishes the second baseband process.

2-3. Effect

According to this embodiment, the passband of the variable bandpass filter 72 is variably set based on the strength of the signal output from the variable bandpass filter 72, and the positioning process is performed based on the signal output from the variable bandpass filter 72. Specifically, the signal strength of the received signal from each acquisition target satellite is calculated by the coherent accumulation process and the incoherent accumulation process, and the passband of the variable bandpass filter 72 is changed to the high-sensitivity band or the high-accuracy band as a result of determining whether or not the signal strength average value is equal to or greater than the threshold value. Therefore, it is possible to pursue sensitivity when the signal reception state is poor by narrowing the passband of the variable bandpass filter 72, and to pursue accuracy when the signal reception state is good by increasing the passband of the variable bandpass filter 72.

2-4. Modification 2-4-1. Host CPU

The host CPU 110 may perform some or all of the processes performed by the CPU 91 of the baseband process circuit section 92 by means of software. For example, the host CPU 110 may perform the passband change process, and the CPU 91 of the baseband process circuit section 92 may perform the acquisition/tracking process of the GPS satellite signal, the positioning process, and the like based on the signal which has passed through the variable bandpass filter 72. The host CPU 110 may perform the positioning process based on the GPS satellite signal acquired and tracked by the CPU 91.

2-4-2. RF Reception Circuit Section

This embodiment has been described above taking an example in which the RF reception circuit section 60 and the variable bandpass filter 72 are separately provided. Note that the variable bandpass filter 72 may be incorporated in the RF reception circuit section 60. In this case, the variable bandpass filter 72 may be formed using a digital filter, and the IF signal may be converted into a digital signal and then caused to pass through the variable bandpass filter 72. Alternatively, the variable bandpass filter 72 may be formed using an analog filter, and the IF signal may be caused to pass through the variable bandpass filter 72 and then converted into a digital signal.

2-4-3. Passband Change Timing

This embodiment has been described above taking an example in which the passband change timing occurs every second (positioning interval). Note that the passband change timing may occur every 20 milliseconds which is the coherent accumulation time when the passband is the high-sensitivity band, or may occur every 10 milliseconds which is the coherent accumulation time when the passband is the high-accuracy band.

Alternatively, the passband may be changed when the acquisition target satellite has changed. Specifically, the passband change determination is not performed when the number or type of satellites currently determined to be the acquisition target in the acquisition target satellite determination process is the same as that of the satellites previously determined to be the acquisition target, and the passband change determination is performed when the number or type of satellites currently determined to be the acquisition target in the acquisition target satellite determination process differs from that of the satellites previously determined to be the acquisition target.

2-4-4. Passband

This embodiment has been described above taking an example in which the number of passbands is two (i.e., high-sensitivity band and high-accuracy band). Note that the number of passbands may be three or more. Specifically, three different frequency bands are provided as passbands, and three value ranges (conditions) which should be satisfied by the signal strength average value are set as the conditions (change conditions) for changing the passband, for example. The passband is changed depending on the range in which the signal strength average value is included.

2-4-5. Change Condition

This embodiment has been described above taking an example in which the passband is changed by determining whether or not the average value of the signal strengths of all of the acquisition target satellites is equal to or greater than the threshold value. Note that the passband may be changed by calculating the total value (hereinafter called "signal strength total value") of the signal strengths of all of the acquisition target satellites and determining whether or not the signal strength total value is equal to or greater than the threshold value.

Alternatively, the passband may be changed based on the history of the signal strength average value or the signal strength total value. Specifically, the passband is changed to the high-sensitivity band when the signal strength average value (signal strength total value) has been consecutively determined to be less than the high-accuracy threshold value 10 times, and the passband is changed to the high-accuracy band when the signal strength average value (signal strength total value) has been consecutively determined to be equal to or greater than the high-accuracy threshold value 10 times, for example.

2-4-6. Variable Bandpass Filter

Two or more variable bandpass filters may be used instead of one variable bandpass filter. Specifically, combinations of the variable bandpass filter and the memory are provided, and a GPS satellite group is assigned to each combination.

Figure 12:
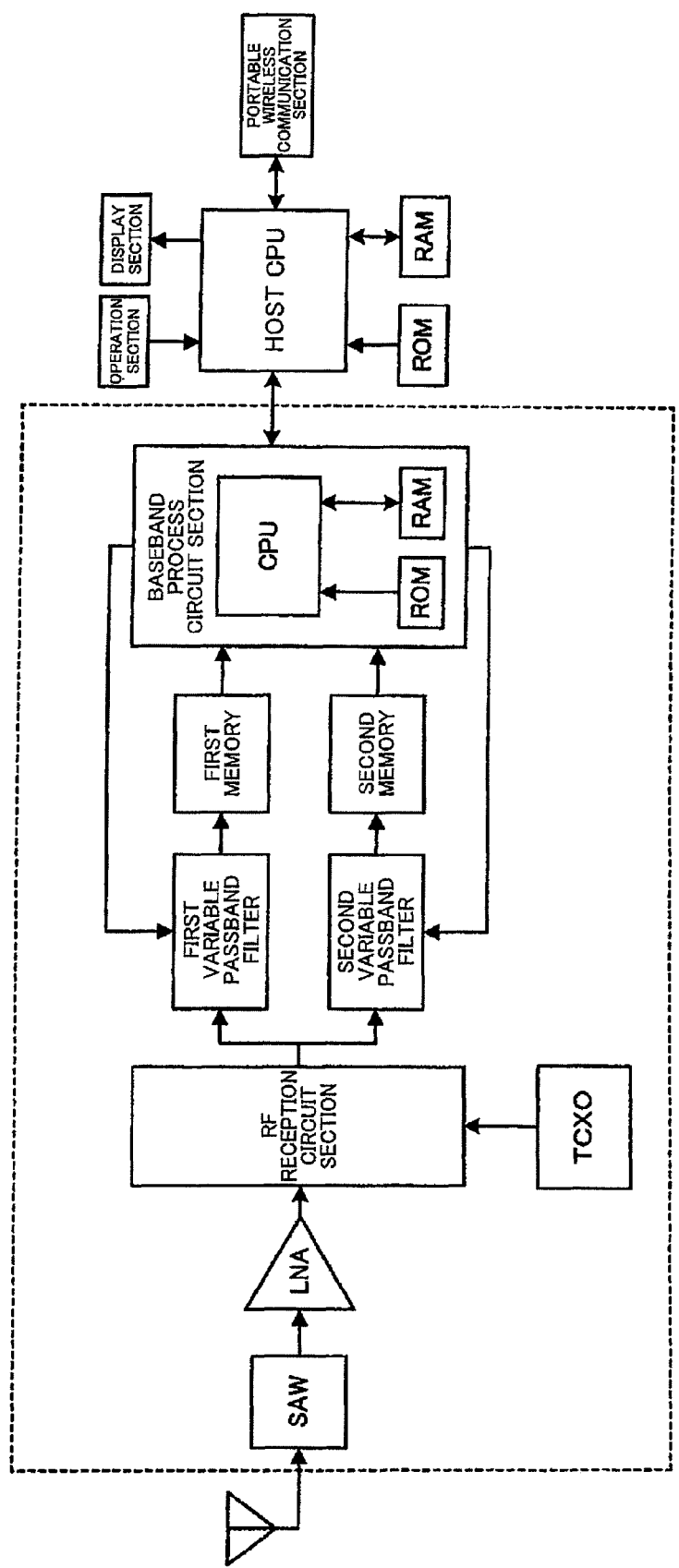
FIG. 12 is a block diagram showing the configuration of a portable telephone according to a modification.

As shown in FIG. 12, a first combination of a first variable bandpass filter and a first memory and a second combination of a second variable bandpass filter and a second memory are provided, for example. A high-angle-of-elevation GPS satellite group located at a position with an angle of elevation equal to or greater than a specific angle is assigned to the first combination, and a low-angle-of-elevation GPS satellite group located at a position with an angle of elevation less than the specific angle is assigned to the second combination. The signal strength average value of the received signals is calculated in group units and subjected to the threshold value determination, and the passband of the variable bandpass filter corresponding to each group is changed.

3. Others 3-1. Application Example

The invention may be applied to various electronic instruments such as a personal digital assistant (PDA), a portable navigation system, and a car navigation system in addition to the portable telephone.

3-2. Processor

The above embodiments have been described above taking an example in which the processor which controls the baseband process circuit section is the CPU. Note that the processor may be a digital signal processor (DSP), for example.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention.

What is claimed is:

1. A positioning device comprising:
   a first signal system that includes a first filter that has a variable passband, and extracts a signal in a specific frequency band from a signal received from a GPS satellite, and a first storage section that stores a signal output from the first filter;
   a second signal system that includes a second filter that has a passband that can be variably set separately from the first filter, and extracts a signal from the signal received from the GPS satellite, and
   a second storage section that stores a signal output from the second filter; and
   a positioning section that performs a specific positioning process based on the signal of the first signal system or the second signal system.

2. The positioning device as defined in claim 1, wherein
   a GPS satellite group is assigned to each of the first signal system and the second signal system under a predetermined condition, and
   the passband of each of the first filter of the first signal system and the second filter of the second signal system are set so as to extract a signal received from each GPS satellite that belongs to the corresponding GPS satellite group.

3. The positioning device as defined in claim 2, wherein the GPS satellite group is assigned to each of the first signal system and the second signal system based on the angle of elevation of each GPS satellite.

4. The positioning device as defined in claim 2, wherein the passband of each of the first filter of the first signal system and the second filter of the second signal system are set so as to extract a signal received from each GPS satellite that belongs to the corresponding GPS satellite group based on the signal strength of the signal received from each GPS satellite that belongs to the corresponding GPS satellite group.

5. The positioning device as defined in claim 1, wherein the first signal system and, the second signal system are provided in a radio frequency (RF) reception circuit section that receives the signal from the GPS satellite.

6. The positioning device as defined in claim 5, wherein the first filter and the second filter are digital filters; and
   the first signal system and the second signal system being provided in the RF reception circuit section so that the signal received from the GPS satellite is converted into a digital signal, and the digital signal is passed through the first filter or the second filter.

7. The positioning device as defined in claim 5, wherein the first filter and the second filter are analog filters, and
   the first signal system and the second signal system being provided in the RF reception circuit section so that the signal received from the GPS satellite is passed through the first filter, the signal that has passed through the first filter is converted into a digital signal, the digital signal converted from the signal that has passed through the first filter is stored in the first storage section, the signal received from the GPS satellite is passed through the second filter, the signal that has passed through the second filter is converted into a digital signal, and the digital signal converted from the signal that has passed through the second filter is stored in the second storage section.

8. The positioning device as defined in claim 1, wherein a first passband is set for the first filter; and
   a second passband that differs from the first passband is set for the second filter.

9. The positioning device as defined in claim 8, wherein the first passband is set to extract a high-accuracy signal from the signal received from the GPS satellite, and
   the second passband is set to extract a high-sensitivity signal from the signal received from the GPS satellite.

10. The positioning device as defined in claim 8, wherein the first passband and the second passband are set to have an inclusion relationship.

11. The positioning device as defined in claim 1, wherein the positioning section changes a coherent accumulation time corresponding to the first signal system or the second signal system, performs a coherent accumulation process on the signal of the corresponding signal system to acquire the GPS satellite signal, and performs the specific positioning process.

12. An electronic instrument comprising:
    a first signal system that includes a first filter that has a variable passband, and extracts a signal in a specific frequency band from a signal received from a GPS satellite, and a first storage section that stores a signal output from the first filter;
    a second signal system that includes a second filter that has a passband that can be variably set separately from the first filter, and extracts a signal from the signal received from the GPS satellite, and a second storage section that stores a signal output from the second filter; and
    a positioning section that performs a specific positioning process based on the signal of the first signal system or the second signal system.

13. A non-transitory computer-readable storage medium storing a program adapted for a device that includes a first signal system that includes a first filter that has a variable passband and exteacts a signal in a specific frequency band from a signal received from a GPS satellite, and a first storage section that stores a signal output from the first filter, a second signal system that includes a second filter that has a passband that can be variably set separately from the first filter, extracts a signal from the signal received from the GPS satellite, and a second storage section that stores a signal output from the second filter, and a processor that can execute a program, the program causing the processor to:

set the passbands of the first filter and the second filter; and
perform a specific positioning process based on the signal of the first signal system or the second signal system.

* * * * *